United States Patent [19]
Suu et al.

[11] Patent Number: 5,930,818
[45] Date of Patent: Jul. 27, 1999

[54] INFORMATION COMMUNICATION SYSTEM WHICH TRANSMITS MAIN DATA AND DATA FOR RESTORING THE MAIN DATA

[75] Inventors: Hiroshi Suu, Chigasaki; Haruhiko Ito, Yokohama; Masana Minami; Yasuo Fukuda, both of Tokyo, all of Japan

[73] Assignee: Kabushiki Kaisha Toshiba, Kawasaki, Japan

[21] Appl. No.: 08/916,284

[22] Filed: Aug. 22, 1997

Related U.S. Application Data

[63] Continuation of application No. 08/607,188, Feb. 26, 1996, abandoned, which is a continuation of application No. 08/168,156, Dec. 17, 1993, abandoned.

[30] Foreign Application Priority Data

Dec. 18, 1992 [JP] Japan ..................................... 4-337712
Feb. 12, 1993 [JP] Japan ..................................... 5-023892

[51] Int. Cl.⁶ ..................................................... G06F 13/14
[52] U.S. Cl. .............................................................. 711/115
[58] Field of Search .................................... 711/103, 115; 235/492; 395/200.43

[56] References Cited

U.S. PATENT DOCUMENTS

| | | | |
|---|---|---|---|
| 4,829,169 | 5/1989 | Watanabe ................................. | 235/492 |
| 4,841,133 | 6/1989 | Gercekci et al. ........................ | 235/492 |
| 4,874,935 | 10/1989 | Younger ................................... | 235/492 |
| 5,027,214 | 6/1991 | Fujimori ................................... | 348/233 |
| 5,032,927 | 7/1991 | Watanabe et al. ....................... | 386/101 |
| 5,107,743 | 4/1992 | Decker ...................................... | 84/478 |
| 5,511,000 | 4/1996 | Kaloi et al. .............................. | 704/201 |
| 5,537,224 | 7/1996 | Suzuoki et al. .......................... | 358/462 |
| 5,583,801 | 12/1996 | Croyle et al. ............................ | 702/115 |

FOREIGN PATENT DOCUMENTS

| | | |
|---|---|---|
| 0 408 132 | 1/1991 | European Pat. Off. . |
| 0 449 493 | 10/1991 | European Pat. Off. . |
| 3-214310 | 9/1991 | Japan . |

OTHER PUBLICATIONS

Patent Abstracts of Japan, vol. 14, No. 499 (M–1042), Oct. 31, 1990, JP–A–22 005 443, Aug. 15, 1990.
Patent Abstracts of Japan, vol. 15, No. 495 (P–1288), Dec. 13, 1991, JP–A–32 014 310, Sep. 19, 1991.

*Primary Examiner*—Eddie P. Chan
*Assistant Examiner*—Kevin L. Ellis
*Attorney, Agent, or Firm*—Oblon, Spivak, McClelland, Maier & Neustadt, P.C.

[57] ABSTRACT

An information communication system in which main data and restore-date used for restoring the main data are written in a memory card by a first information apparatus. The main data and the restore-data are read from the memory card by a second information apparatus. On the basis of the restore-data, the main data is restored by the second information apparatus. The main data, thus restored is processed and/or output by the second information apparatus.

12 Claims, 11 Drawing Sheets

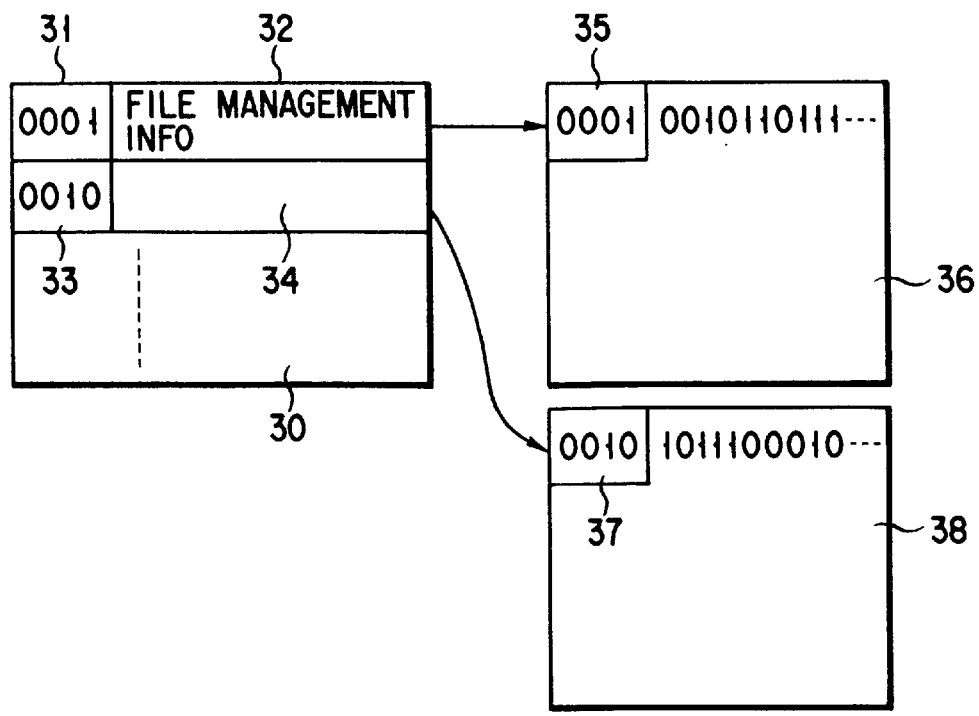
F I G. 6
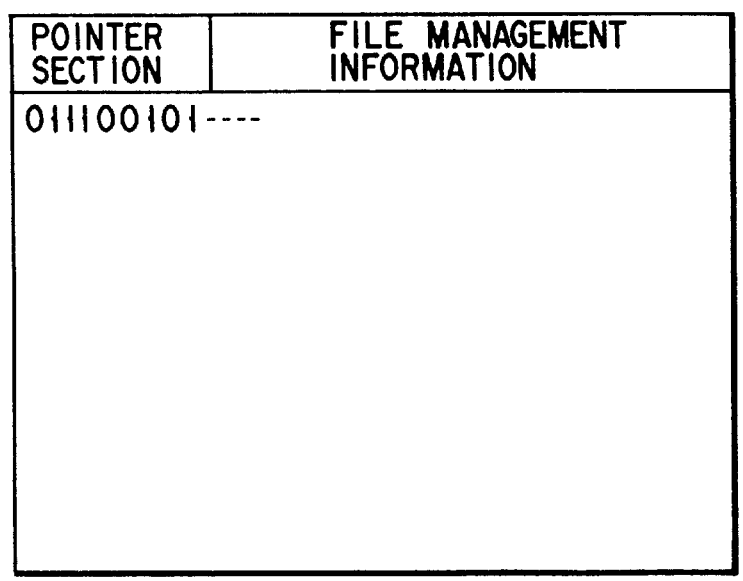
F I G. 7

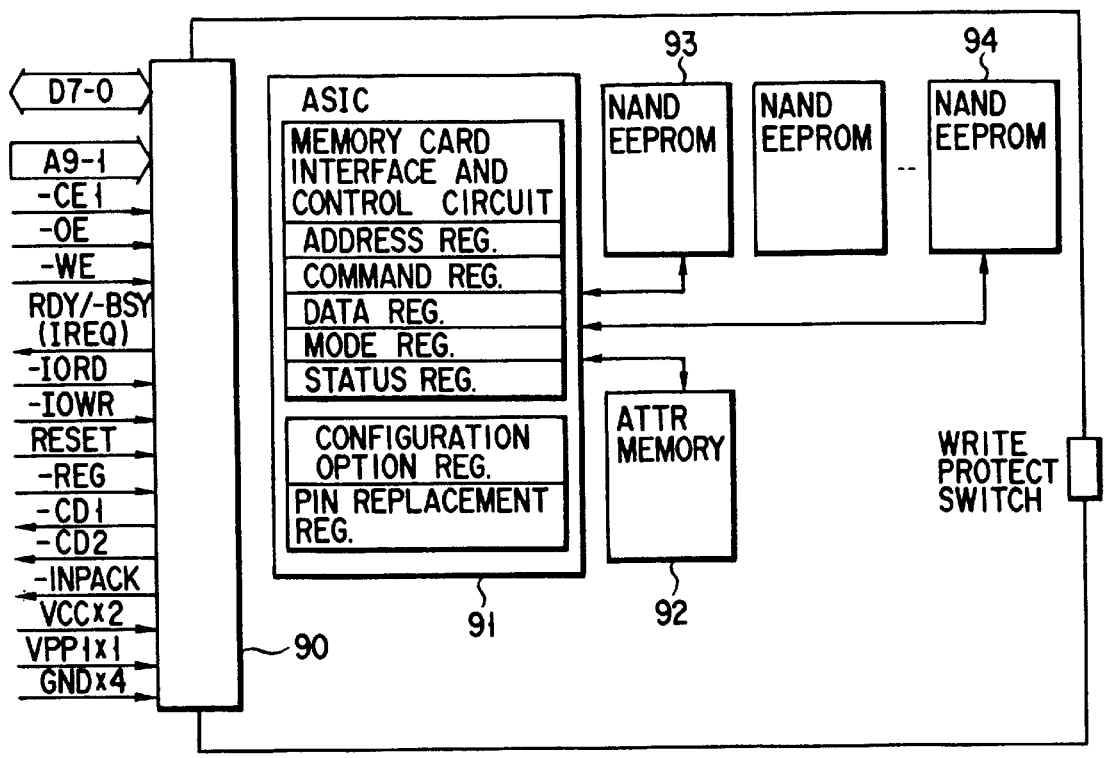
F I G. 13
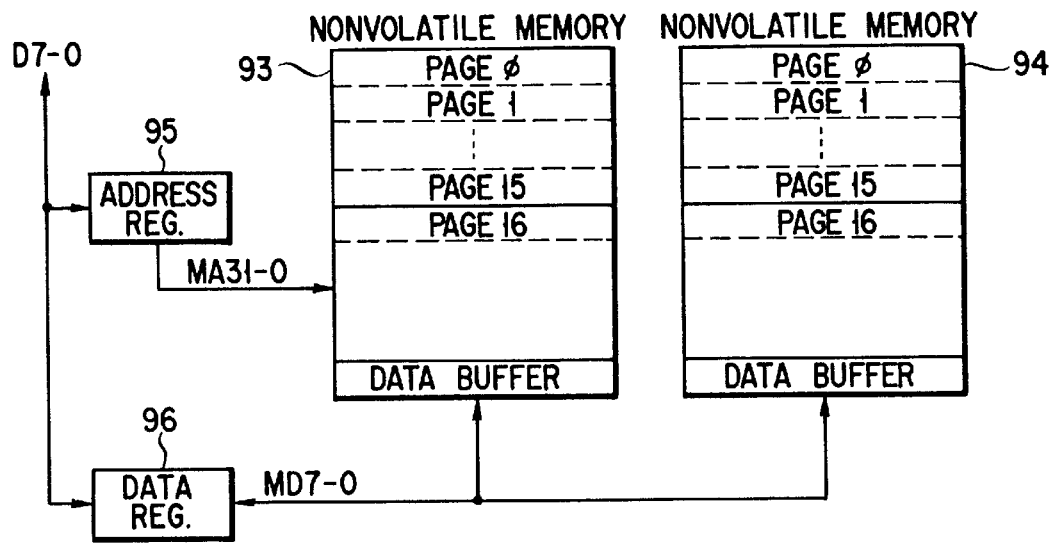
F I G. 14

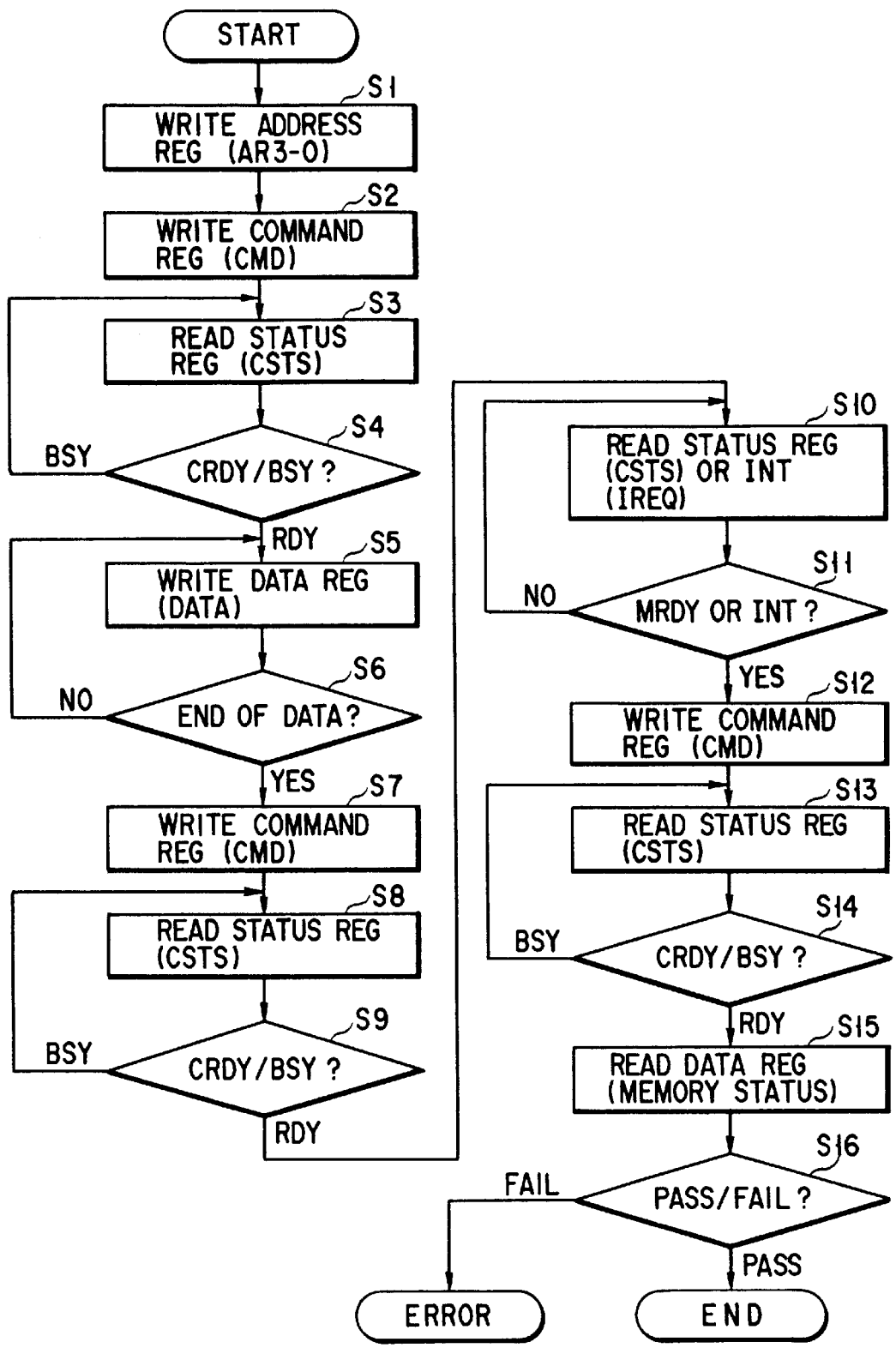
F I G. 16

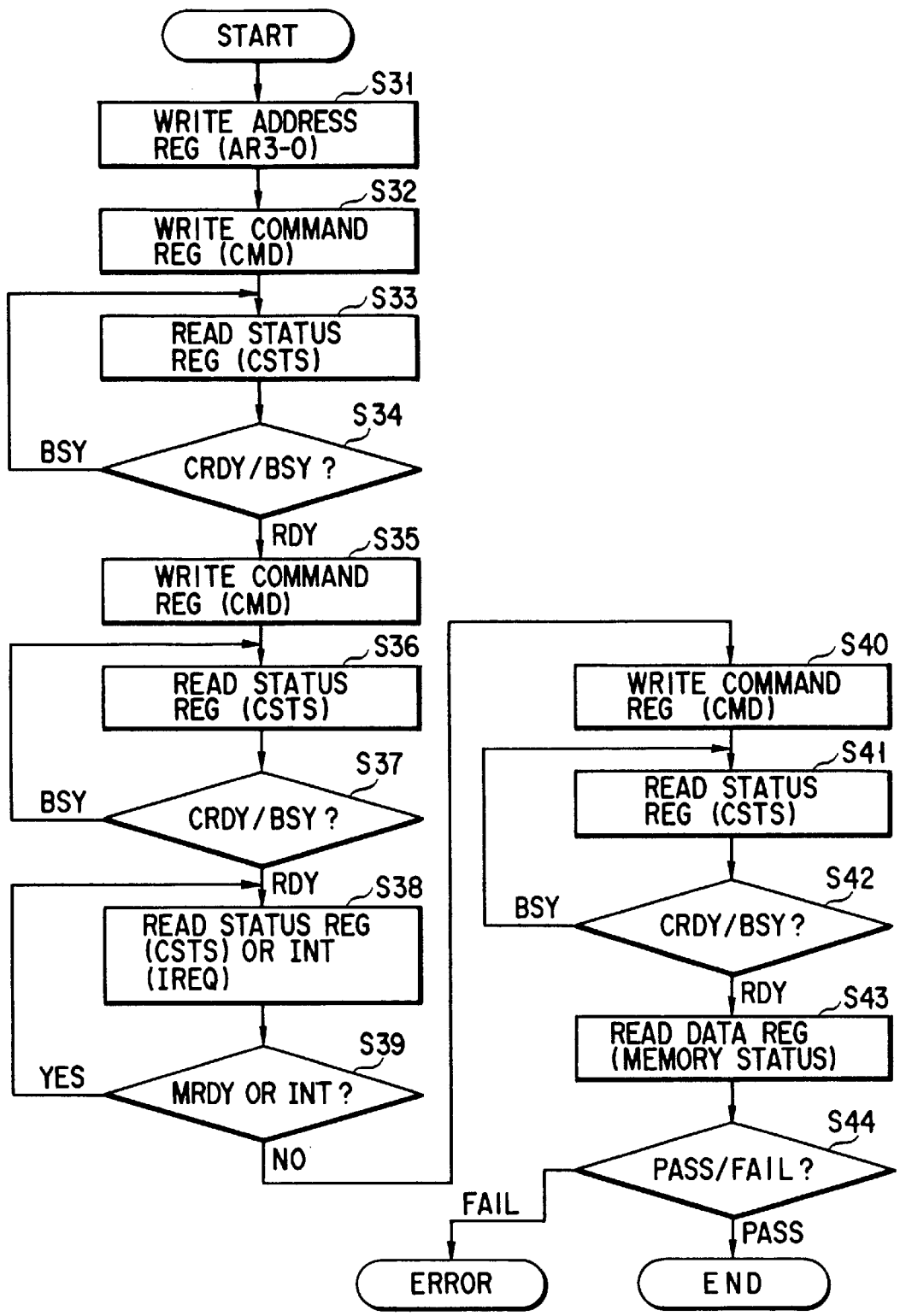
F I G. 18

INFORMATION COMMUNICATION SYSTEM WHICH TRANSMITS MAIN DATA AND DATA FOR RESTORING THE MAIN DATA

This application is a Continuation of application Ser. No. 08/607,188, filed on Feb. 26, 1996, now abandoned, which is a continuation of application Ser. No. 08/168,156, filed on Dec. 17, 1993, now abandoned.

BACKGROUND OF THE INVENTION

1. Field of the Invention

This invention relates to an information transmission system which integrates various types of information equipment so as to make them function as a single system.

2. Description of the Related Art

Today, there is a flood of various types of information equipment on the market. They include personal computers, workstations, electronic notebooks, printers, copiers, electronic cameras, telephones, and facsimiles. Data exchange between such various types of information equipment is effective. The most common way to realize such data exchange is to connect various types of information apparatuses to each other through a LAN (local area network).

There arise various problems in introducing a LAN. They include: whether existing information apparatuses meet or can meet the requirements of a LAN; a LAN infrastructure must be prepared in advance; and data exchange cannot be performed between information apparatuses which differ in the method of handling data. If most of the existing information apparatuses cannot meet the LAN requirements, there is not much to be gained by introducing a LAN and therefore a LAN would not be introduced. Should the LAN be introduced forcibly, it would be necessary to introduce new types of LAN-compatible information equipment instead of the existing information apparatuses, resulting in an increase in the installation cost.

These days, information equipment of the portable type has suddenly been popularized and there have been demands for the use of this type of equipment on a LAN. Since providing for a function compatible with a LAN may hinder this type of equipment from being made portable, it is impossible to meet such demands sufficiently.

A simple method taking the place of the LAN is to use a floppy disk to mediate information between information apparatuses. This method, however, has several problems. They include slow writing/reading speeds, insufficient memory capacity, and the necessity of installing a driver in an information apparatus with a floppy-disk drive.

The ability to connect with communication equipment such as portable telephones is an important item for information transmission. Although the portable telephone is essentially designed to transmit and receive speech data, it can also transmit and receive such digital data as is recorded on a floppy disk. However, it is not practical to transmit and receive digital data by means of communication equipment such as portable telephones, taking into account transmission cost due to the circuit rental fee, an increase in the size of the unit resulting from the addition of a floppy-disk drive, and a decrease in the operating time due to the power consumption by the floppy-disk drive.

Recently, mediums with a large memory capacity such as optical disks or magnetic disks have been put to practical use and are finding wide application. The application includes data exchange as disclosed in Jpn. Pat. Appln. KOKAI Publication No. 3-214310, which has disclosed a method of using a multimedia memory device with a storage medium of an optical disk as a common memory among different types of information apparatuses and realizing data exchange between the different types of information apparatuses via the multimedia memory device. Even this multimedia memory device, however, have a problem. As shown in FIG. 3 of Jpn. Pat. Appln. KOKAI Publication No. 3-214310, because the memory area of an optical disk is previously divided for each information apparatus, the capacity is exceeded at random for each memory area on account of the difference in the frequency of use of each information apparatus. In addition, since an information apparatus to be connected to the multimedia memory device is selected by operating a button on the panel PNL of FIG. 2 in Jpn. Pat. Appln. KOKAI Publication No. 3-214310, operation tends to be complicated. Furthermore, among the different types of information apparatuses, there is a combination of data-incompatible apparatuses. To make data exchangeable between such information apparatuses, it is necessary to provide the multimedia memory device with a data format converting function for making data exchangeable. This is troublesome. Since the multimedia memory device is shared by more than one information apparatus, there is no denying the possibility that entries to the multimedia memory device will overlap with each other and consequently there will be a waiting time before each entry is made.

An attempt to exchange data by means of IC cards intervening between various types of information apparatuses has been made recently. This attempt also has the following problem. A semiconductor memory device known as an SRAM is generally used as a memory built in an IC card. Thus, to prevent the information from being lost, it is necessary to incorporate a backup power supply in the IC card, making the card larger. When the built-in battery has run down, the important stored information is lost. To avoid this, the user has to replace the built-in battery periodically. Further, in order that the data sent from an information apparatus incompatible with the apparatus at the called party can be read by the latter, data-format information from an information apparatus at the calling party must be previously given to the information apparatus at the called party. This is troublesome.

Recently, nonvolatile semiconductor memory devices have appeared as an alternative to fixed magnetic disks. The fixed magnetic disk unit is provided with many functions for exchanging data with the CPU (central processing unit). When as many functions as there are with the fixed magnetic disk are given to the driver for nonvolatile semiconductor memory devices, an increase in the cost results.

With a conventional transmission method of connecting various types of information equipment to a transmission line such as a LAN and transmitting digital data of video or audio information between information apparatuses, data can be exchanged only between data-compatible information apparatuses, with the result that data transmission is restricted to a very limited range. There is another method of transmitting data via a magnetic recording medium. This method, however, has a portability problem, an information reliability problem, and a durability problem. In addition, the last method cannot be used between data-incompatible information apparatuses.

SUMMARY OF THE INVENTION

The object of the present invention is to provide an information transmission system which realizes data exchange between various types of information equipment easily and at low cost and integrates the various types of information equipment so as to make them function as a seemingly single system.

The foregoing object is accomplished by providing an information transmission system comprising: transmission means; information apparatuses on the transmission side for transmitting data together with data-format information to the transmission means; and information apparatuses on the reception side for reading the data inputted from the information apparatuses on the transmission side via the transmission means according to the data-format information.

With the present invention, because the data from an information apparatus on the transmission side is sent together with data-format information to an information apparatus on the reception side via transmission means, the information apparatus on the reception side can read the data even if not holding the format of the data sent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 shows an example of data being stored in the IC card according to an embodiment of the present invention;

FIG. 7 shows another example of data being stored in the IC card according to an embodiment of the present invention;

FIG. 13 shows a concrete configuration of the inside of the IC card of FIG. 12;

FIG. 14 illustrates the connections inside the IC card of FIG. 12 at data readout time;

FIG. 16 is a flowchart of the procedure of the program operation in the IC card of FIG. 12;

FIG. 18 is a flowchart of the procedure of the erase operation in the IC card of FIG. 12.

DETAILED DESCRIPTION OF THE PREFERRED EMBODIMENT

Hereinafter, an embodiment of the present invention will be explained with reference to the accompanying drawings. The basic concept of the present invention is that first, even if there is no data compatibility between the transmission side and the reception side, it is made possible for an information apparatus on the reception side to read the sent data, and that second, it is made possible for information apparatuses incompatible with transmission lines of a network such as a LAN to exchange data between them by building them in the network.

Figure 1:
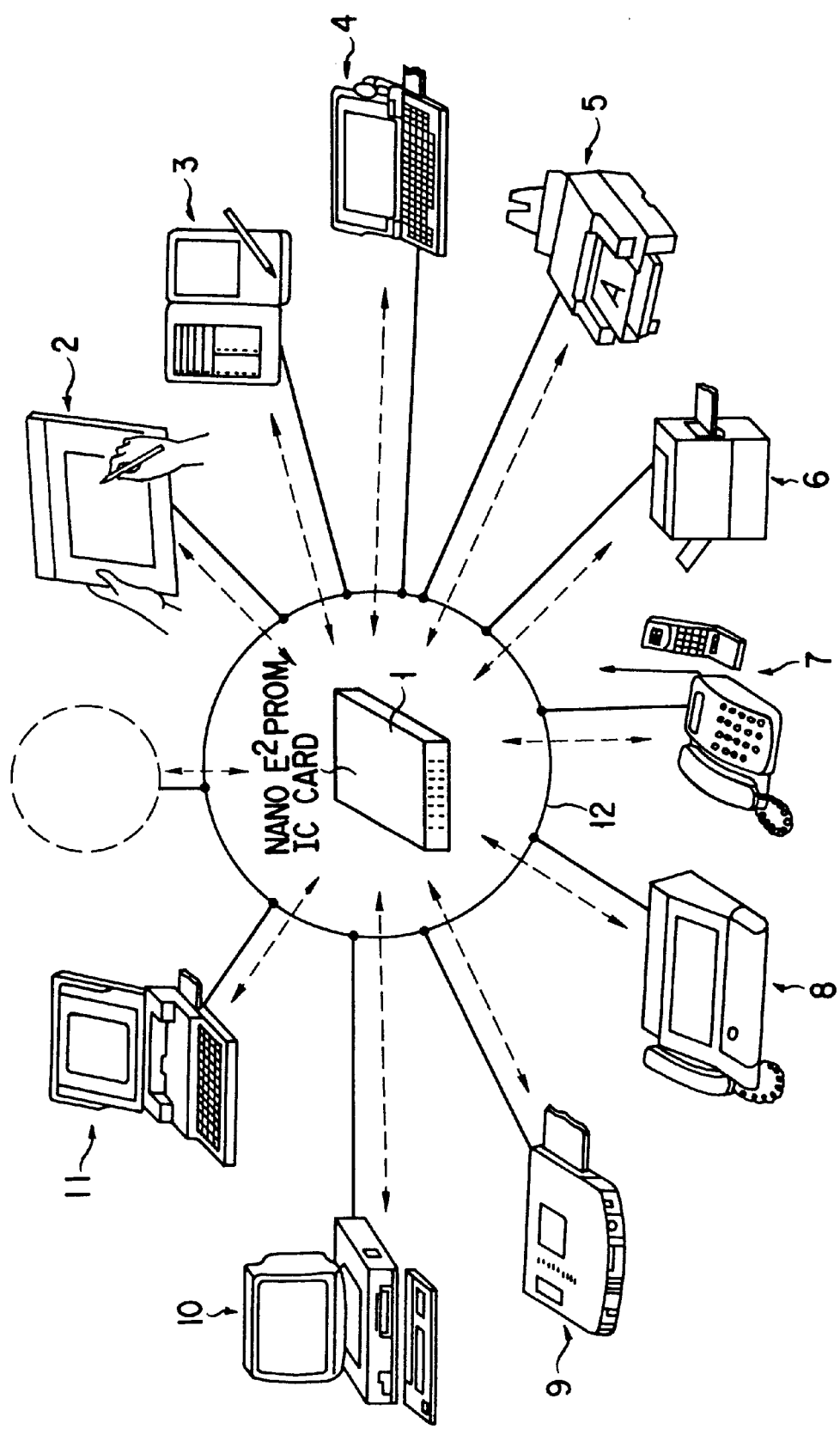
FIG. 1 is a conceptual diagram of an overall information transmission system according to an embodiment of the present invention.
Figure 2A:
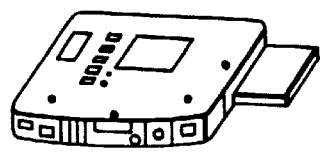
FIGS. 2A through 2D are views of outward appearance of the individual information apparatuses of FIG. 1.
Figure 2B:
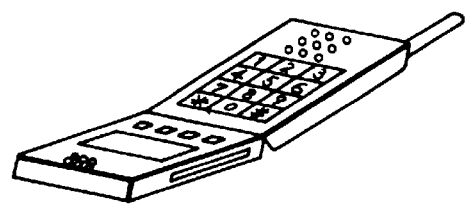
Figure 2C:
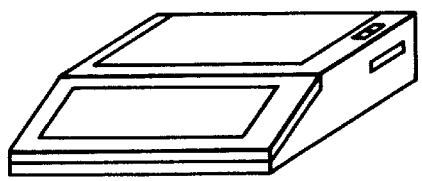
Figure 2D:
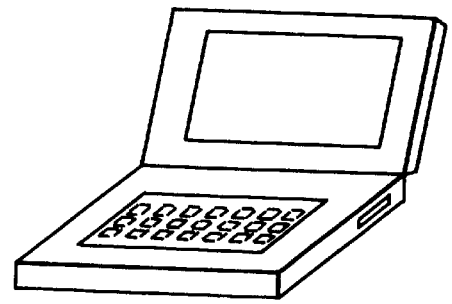

FIG. 1 is a view of an overall configuration of an information transmission system according to an embodiment of the present invention. As examples of various types of information equipment contained in a data transmission network, FIG. 1 shows a personal computer with pen input 2, an electronic notebook 3, a word processor 4, a printer 5, a copier 6, a telephone 7, a facsimile 8, an electronic camera (also called a steal camera) 9, a workstation 110, and a personal computer 11. Of course, other types of information apparatuses may be used instead. The data-format of one of information apparatuses is different from that of other of information apparatuses.

An IC card 1 as a card-like portable memory medium contains a nonvolatile semiconductor memory element. Specifically, this semiconductor memory element is an electrically erasable PROM (Programmable Read Only Memory) (EEPROM, also known as a flash memory) that enables the stored data to be erased and rewritten electrically. This IC card 1 intervenes between various types of information apparatuses 2 through 11 as transmission means, which exchange data with each other.

The various types of information apparatuses 2 through 11 are connected to a transmission line 12 (a public line of telecommunication or a LAN (local area network)), through which data exchange can be effected.

All the information apparatuses 2 through 11 are each provided with connectors that permit installation and removal of an IC card 1 and with transmission means for directly or indirectly accessing the internal memory of the IC card 1. This transmission means creates data and data-format information including information about a reading method and identification information, and then send them to the IC card 1 and the transmission line 12. Any one of the information apparatuses is previously provided with information about a method of reading the data unique to each of the other information apparatuses. The information about a reading method includes: the word identification code; the number of bits per word; encoding information (the sampling frequency, the quantization coefficient, symbol codes); a decoding program itself; and image attribute information (the frame size, scanning procedure).

Figure 3:
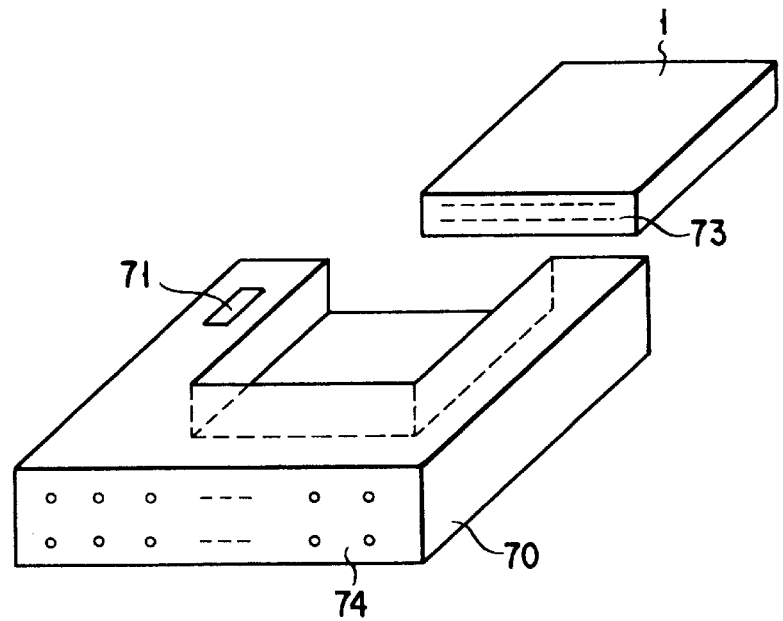
FIG. 3 is a view of outward appearance of an IC-card adapter.

The specification of the IC card 1 may or may not comply with the standards prescribed by JEIDA (the Japan Electronic Industry Development Association). Because the IC card does not require an internal power supply, it is desirable in terms of portability that the IC card 1 should be designed to a size smaller than the standards prescribed by JEIDA, for example, half the prescribed size. Some information apparatuses are already provided with a slot and a connector in which an IC card conforming to the JEIDA standards can be installed. In order that the slot and connector can be used for a half-size IC card 1 without modification, an adapter 70 that allows installation and removal of the IC card of FIG. 3 has been proposed. The adapter 70, whose size and connector pin arrangement comply with the JEIDA standards, is designed to be inserted in a slot conforming to the JEIDA standards already provided in an existing information apparatus. The adapter 70 contains a logic circuit for performing signal conversion for the exchange of signals between IC cards. A driving power supply may be incorporated in the adapter 70 or the adapter 70 may be powered externally. The adapter 70 is provided with an injector 71 that facilitates installation and removal of the IC card 1. Of course, providing an information apparatus with an connector may be replaced with connecting an IC read/write unit to an information apparatus.

Figure 4:
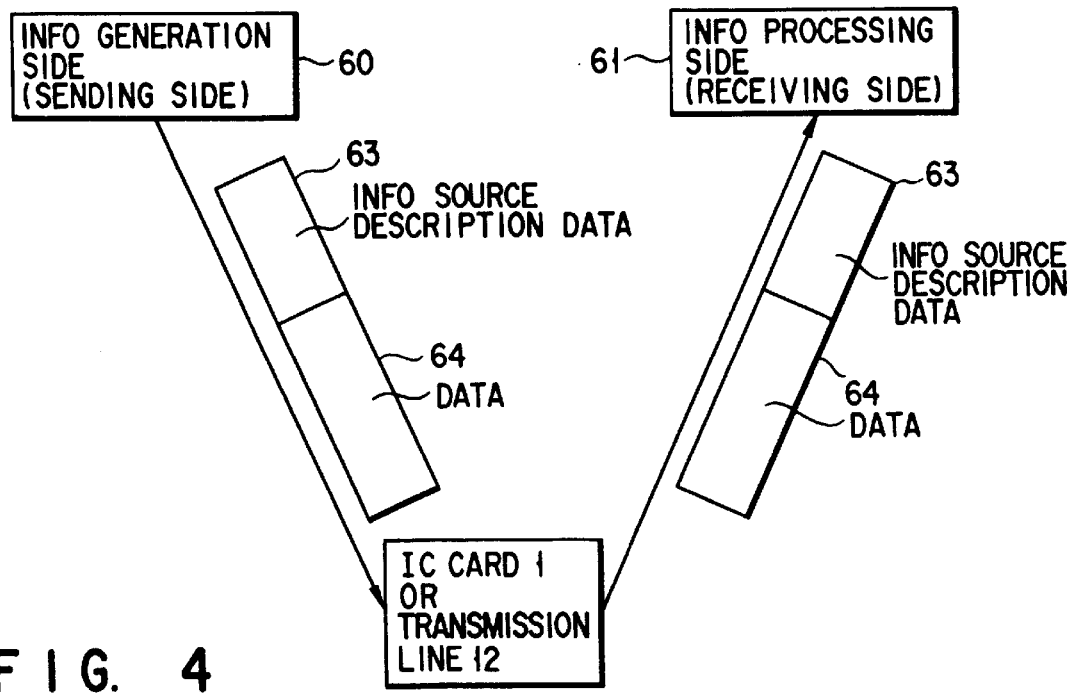
FIG. 4 shows the flow of data transmission and the information to be transmitted according to an embodiment of the present invention.

FIG. 4 shows data transmitted through an IC card 1 or a transmission line 12. Data 64 generated at transmission means 60 on the information generation side (the transmission side), any one of the various types of information apparatuses 2 through 11, is written together with information source description data 63 in the IC card 1, or is sent to reception means 61 on the reception side via the transmission line 12. The information source description data 63 includes data-format information unique to an information apparatus on the transmission side and the identification information unique to an information apparatus on the transmission side. The reception means 61, an information apparatus on the reception side, even if it is not previously given information on a method of reading data from an information apparatus on the transmission side, can read the data transmitted from the transmission means 60, an information apparatus on the calling party, according to the reading method contained in data format information of the information source description data 63. This enables the sent data to be processed inside an information apparatus on the reception side. The reception means 61, if it is previously given information on a method of reading the data unique to an information apparatus on the calling party and holds it, can read the data according to the method of reading the data unique to an information apparatus on the calling party selected on the basis of the identification information.

Figure 5:
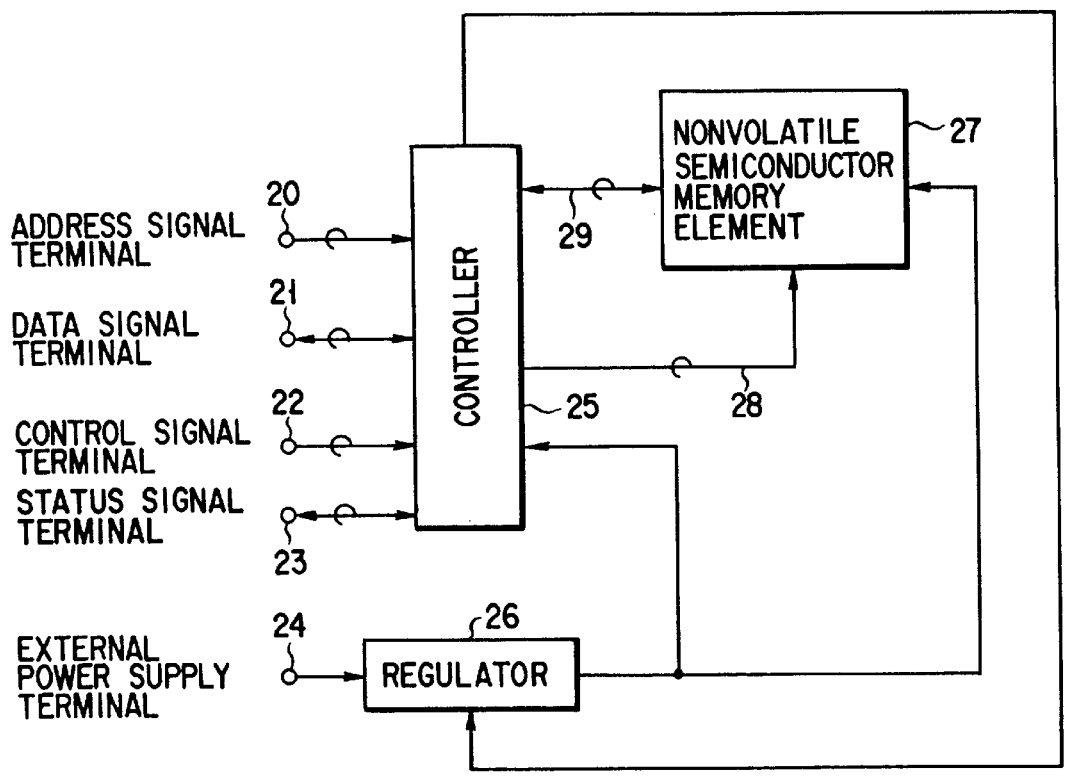
FIG. 5 is a block diagram of the IC (Integrated Circuit) card of FIG. 1.

An example of the internal construction of the IC card 1 will be described with reference to FIG. 5. The interfacing of the internal circuit of the IC card 1 with an external information apparatus and an external power supply unit is effected by an address signal terminal 20, a data signal terminal 21, a control signal terminal 22, a status signal terminal 23, and an external power supply terminal 24. The power supplied from the external power supply terminal 24 is converted by a regulator 26 into the necessary power supply voltage, which is supplied to the internal circuit. The voltage supplied to the external power supply terminal 24 is generally 5 V. When the internal circuit requires another voltage, a different voltage, for example, a high voltage of nearly 18 V may be supplied. The controller 25, when accessed by an external information apparatus of the IC card 1, starts to control the read/write operation of a nonvolatile semiconductor memory element 27. The IC card 1 can operate in two operating modes: the memory mode and the I/O (Input-Output) mode. The memory mode is a mode in which an external information apparatus directly specifies the address of the nonvolatile semiconductor memory element 27 in the IC card 1. In this mode, the IC card 1 acts as an expansion memory like the internal memory in an external information apparatus. On the other hand, in the I/O (Input-Output) mode, the IC card 1 is treated as a file unit. In this mode, an external information apparatus does not directly specify the address of the nonvolatile semiconductor memory element 27 in the IC card.

A file in the IC card is accessed by an external information apparatus by sending a data signal and a control signal to the controller 25. Because the file information is also stored in the nonvolatile semiconductor memory element 27, the controller 25 generates a file information address, accessing the nonvolatile semiconductor memory element 27 via a signal line 28 by using the file information address as an ADR signal, treating the file information read from the nonvolatile semiconductor memory element 27 via the I/O line 29 as a data signal, outputting this data signal and a status signal to an external information apparatus via the data signal terminal 21 and the status signal terminal 23, respectively. What is important here is that the address of each file information item in the nonvolatile semiconductor memory element 27 has been determined previously in order to access at least the file information. The information for accessing may contain only a pointer or the file information itself. The address information is stored in a particular location in the memory space of the nonvolatile semiconductor memory element 27, for example, the first location or the last location.

The controller 25 obtains information including the start address of the file, the memory size, and the type of data in the nonvolatile semiconductor memory element 27 on the basis of the file information read from the memory element 27, and outputs this file information to an external unit via the data signal terminal 21. At the same time, it outputs a status signal indicating file information to the external unit via the status signal terminal 23. When having received a file access request combined with a data signal and a control signal from an external apparatus, the controller 25, on the basis of these signal, generates an actual address of the nonvolatile semiconductor memory element 27 as an ADR signal. By this ADR signal, the controller 25 accesses the nonvolatile semiconductor memory element 27, converts the data taken in from the I/O line 29 into a necessary form, and outputs this converted signal to an external unit via the data signal terminal 21. At the same time, it outputs an status signal indicating file data to the external unit via the status signal terminal 23.

To write a file, the controller 25 first recognizes a blank area of the nonvolatile semiconductor memory element 27 from the file information, determines the start address at which a file is to be stored, sends the file data sent from an external unit via the data signal terminal 21 together with a PGM signal (a program signal) indicating the write mode to the nonvolatile semiconductor memory element 27 via the I/O line 29, and writes the file data in the memory area. Supplying the PGM signal may be replaced with causing the regulator 26 to supply a high voltage for a program differing from the voltage normally supplied to the nonvolatile semiconductor memory element 27, depending on the situation. The controller 25 writes the file data in the nonvolatile semiconductor memory element 27, while counting the amount of data written into, and at the time when the writing is completed, adds the start address of the file data and its data size to the file information. In addition to this, data on the type of data is also added to the file information.

Another method of accessing the file information by a combination of an address signal and a control signal can be considered. Specifically, the address space of the nonvolatile semiconductor memory element 27 is logically divided into a file data area and an area for attribute information including file information. Then, using an address signal and a control signal indicating the area of attribute information, the nonvolatile semiconductor memory element 27 is accessed. The operation for this is the same as that in the I/O mode and its explanation will be omitted. The logical dividing of the address space into the file data area and the attribute information area facilitates access. To deal with the file data, however, it is necessary to perform address control with an external unit. In storing the information unique to the IC card 1 including the memory size, the type of element, and the operating speed, the logical division is effective.

Figure 8:
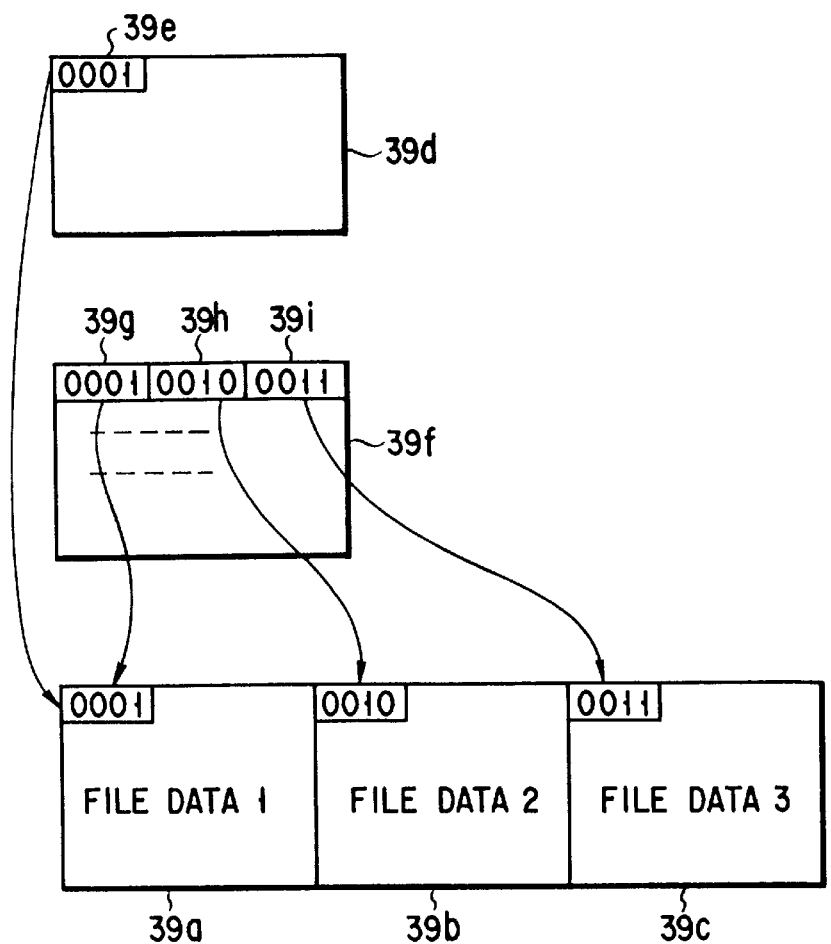
FIG. 8 shows still another example of data being stored in the IC card according to an embodiment of the present invention.

Explained next will be an example of storing data. FIG. 6 shows an example of storing a pointer and the file management information in a memory area different from that for the file data. In the example of FIG. 6, pointers 31 and 33 representing the start addresses are written in the first level of hierarchy. The first level of hierarchy contains the attribute information on the file data stored in the memory area indicated by each pointer, the identification information for identifying an information apparatus on the data transmission side, and the file management information items 32 and 34. The first level also contains information about a method of reading data with an information apparatus on the data transmission side, as information source description data 30. The memory areas in the second level of hierarchy indicated by each pointer each store file data items. Such a hierarchic structure is effective in terms of memory efficiency. As shown in FIG. 7, the pointer and the file management information may be stored in the same memory area in which the file data is stored. FIG. 8 shows an example of storing part of the file information of FIG. 6 as subfile information in a memory area different from that in which file information is stored. For example, speech and moving-picture data are handled in seconds or in frames. Encoding compression and decoding are also generally effected in these units. This enables the head of the speech data to be located and the moving-picture data to be reproduced from a given frame. The speech data and the moving-picture data are stored as file data items 39a, 39b, and 39c in separate memory areas in seconds or in frames. In pointer 39e indicating the start address of a series of file data items in the first level of hierarchy 39d, subfile information 39f is placed as the underlying level of hierarchy. In the subfile information 39f, pointers 39g, 39h, and 39i of the individual data items 39a, 39b, and 39c are written. When the head of the speech data is located or the moving-picture data is reproduced from a given frame, the speech data or the moving-picture data can be reproduced from a given location on the basis of the pointers 39g, 39h, and 39i in the subfile information 39f.

Figure 9:
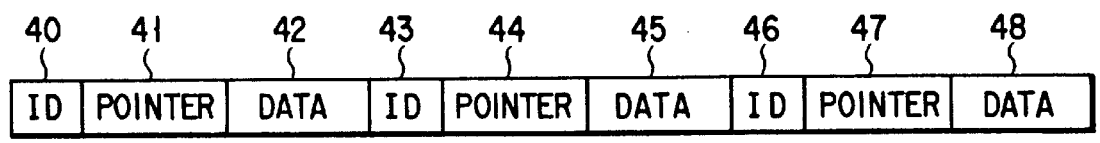
FIG. 9 illustrates a data string in the IC card according to an embodiment of the present invention.
Figure 9:
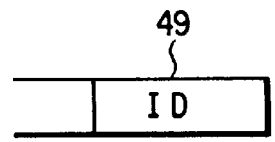

FIG. 9 shows an example of storing the above file management information. The number of words or the data length of the file management information may vary with the information apparatus serving as an information source. Therefore, to increase the memory efficiency, it is desirable that those information items should be divided word by word and written continuously. As shown in FIG. 9, pairs of pointers 41, 44, and 47 and word data items 42, 45, and 48 are written in sequence, dividing the pairs by identifiers 40, 43, and 46, . . . (IDS) representing the type of data, and identifier 49 indicating an end is written at the end.

Figure 10:
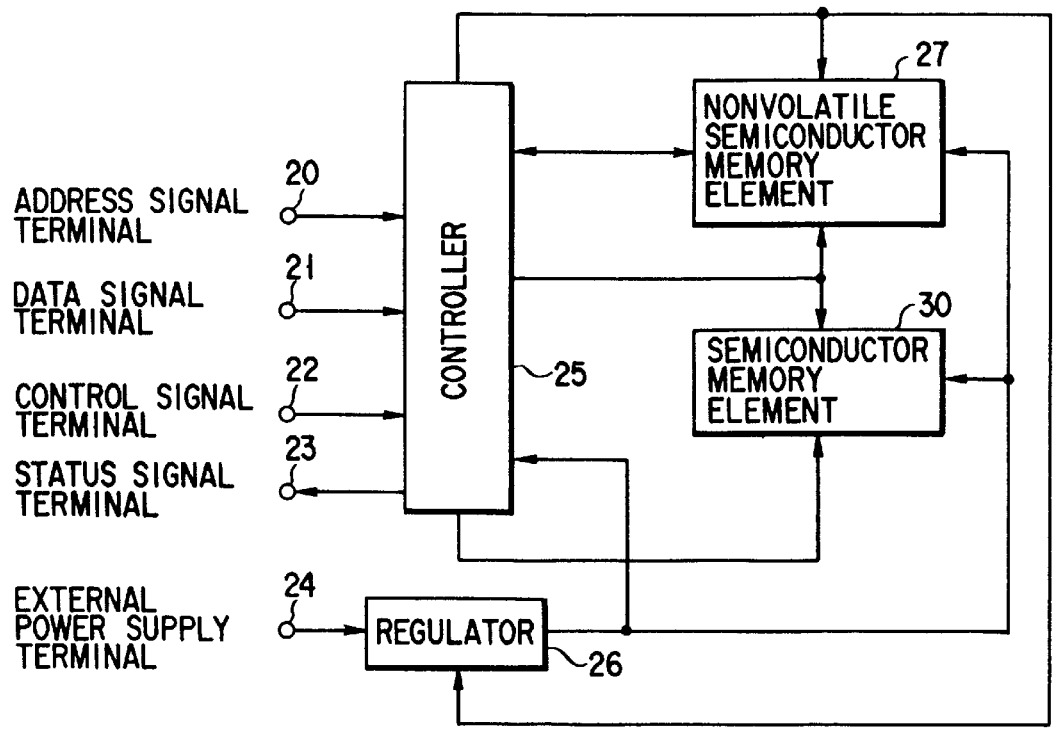
FIG. 10 is another block diagram of the IC card of FIG. 1 according to an embodiment of the present invention.

The IC card 1 may be constructed as shown in FIG. 10. In FIG. 10, the same parts as those in FIG. 5 are indicated by the same reference numerals. A semiconductor memory element 30 added to the diagram of FIG. 5, in which the file information in the nonvolatile semiconductor memory element 27 is copied, is used as a buffer. This makes the access time shorter. When the nonvolatile semiconductor memory element 27 is of the type where the number of writes is limited, the service life of the nonvolatile semiconductor memory element 27 can be made longer. In the case of the memory mode, by downloading an executable program from the nonvolatile semiconductor memory element 27 to the semiconductor memory 30, the program can be accessed directly by an external apparatus, such as a personal computer. Thus, the addition of the semiconductor memory element 30 has a wider variety of application. With the present embodiment using the IC card 1 and the transmission line 12 as transmission mediums, the following functions can be realized. For instance, an image generated by the electronic camera 3 or the copier 6 is processed at the workstation 4. After that, the processed image is transmitted to a third party via the facsimile 8 or the telephone 7 or outputted on the printer 5. It should be noted here that even if each information apparatus is not previously provided with information about a method of reading the data unique to the other information apparatus, it is possible to read the sent data according to the information source description data (information on a reading method) sent together with the data. It should also be noted that if information on a method of reading the data from an information apparatus at the calling party is previously provided to the information apparatus 61 at the called party and held there, it is possible to identify the information apparatus 60 at the calling party on the basis of the identification information, and read the data according to the method of reading the data unique to the identified information apparatus at the calling party. Therefore, data exchange can be achieved even between data-incompatible information apparatuses. Even in the case of information apparatuses without a function compatible with the transmission line 12, the intervention of the IC card 1 enables data to be transmitted and received.

Figure 11:
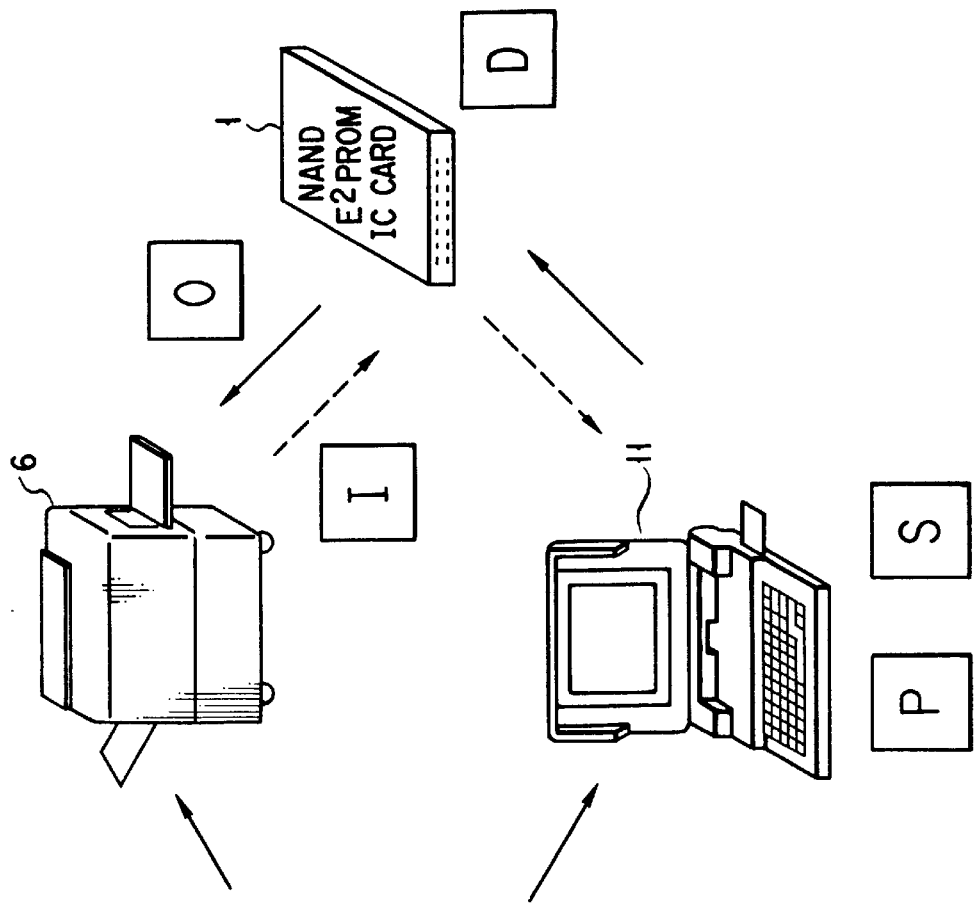
FIG. 11 shows an example of practical use of an embodiment of the present invention.
Figure 11:
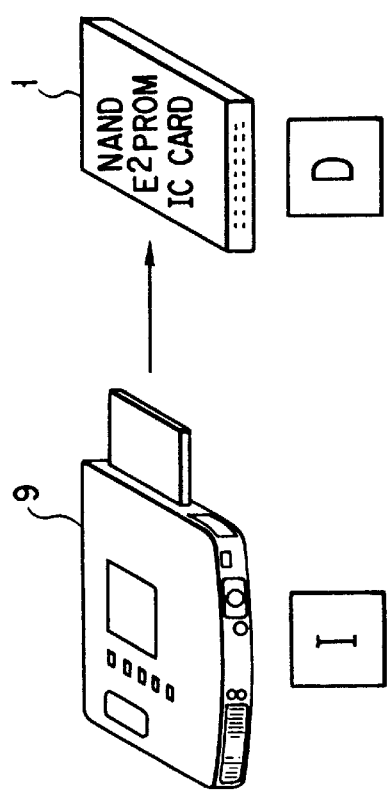

FIG. 11 shows a more concrete use of the IC card. In FIG. 11, the role of each information apparatus is expressed as an input function I, an output function O, a storage function S, a processing function P, and a distribution (transmission) function D. The electronic camera 9 serves as the input function I. The image data taken by the electronic camera 9, together with the information source description data, is stored in the IC card 1 or is transmitted to another information apparatus via the transmission line 12. The IC card 1 is conveyed to a desired copier 6 with human intervention, and is installed in a connector of the copier 6. At this time, the IC card 1, like the transmission line 12, serves as the distribution function D. The copier 6 reads the image data according to the sent information source description data. The image data read in the copier 6 is printed on paper. At this time, the copier 6 fills the role of the output function O. The IC card 1 is carried to a desired personal computer 11 with human intervention and is installed in a connector of the personal computer 11. The personal computer 11 performs a suitable image and an editing process, such as adding a character title, on the image data read according to the information source description data, and stores the processed image data in the built-in hard disk. At this time, the personal computer 11 fills the roles of the processing function P and the storage function S. The image data subjected to the image and editing processes at the personal computer 11 is stored in the IC card 1. The IC card 1 is then carried to a desired copier 6 with human intervention and is installed in a connector of the copier 6. At this time, the IC card 1 serves as the distribution function D. The image data read in the copier 6 is printed on paper.

Figure 12:
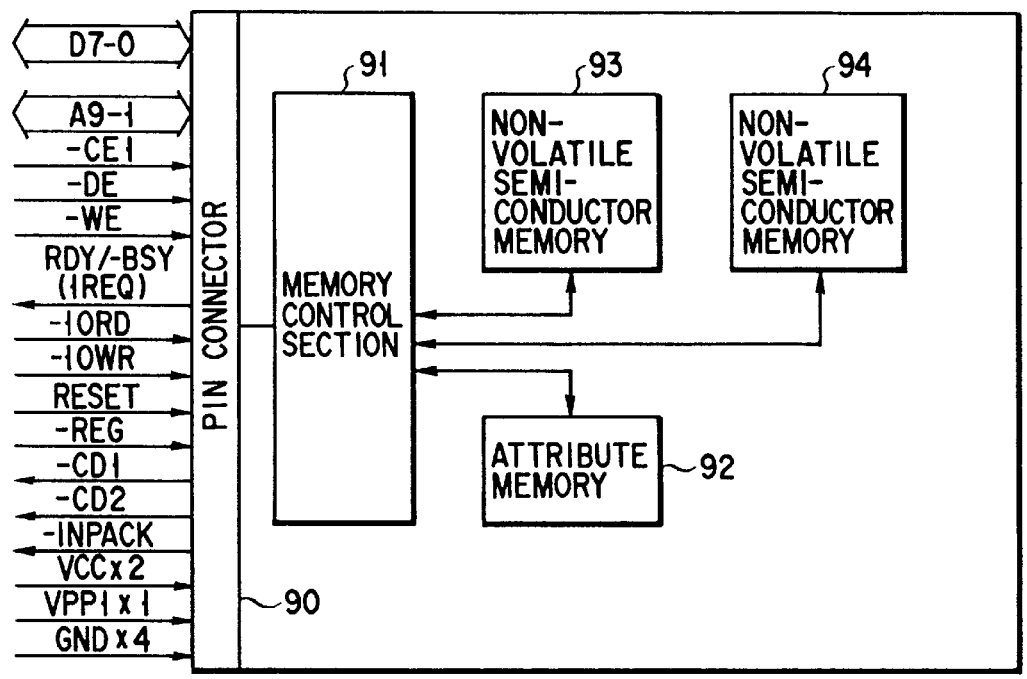
FIG. 12 is still another block diagram of the IC card of FIG. 1.

The above-mentioned transmission system will be explained more concretely. FIG. 12 shows a concrete internal structure of the IC card of FIG. 10. The IC card 1 is provided with a pin connector 90. The pin connector 90 complies with JEIDA/PCMCIA (Personal Computer Memory Card International Association) and is designed for a 68-pin arrangement. To the pin connector 90, a plurality of nonvolatile semiconductor memory elements 93 and 94 acting as the main memory and a read-only attribute memory 92 for storing the attribute information unique to the IC card are connected via a memory control section 91. The number of nonvolatile semiconductor memory elements 93 and 94 is not limited to more than one but may be one. In the pin connector 90, each type of signal input and output has its own pin. Various types of signals (called interface signals) inputted and outputted via the individual pins are enumerated below:

D7-0: Two-way 8-bit data bus. The card is at high impedance in any mode other than the data read mode.

A9-1: Address signal

-CE1: Card enable signal. In accessing the IC card, -CE1 signal is kept low.

-OE: output enable signal. -OE signal is kept low when the card attribute information is read from the attribute memory or information is read from the configuration register. When mapping is effected for a memory card, information can be read from a register set in the IC card.

-WE: Write enable signal. With this card, when information is written into the attribute memory or the configuration memory, -WE is kept low. When mapping is effected for a memory card, information can be written in a register set in the card.

RDY/-BSY: This signal functions as an interrupt request signal (-IREQ) when configuration is made for an I/O card. When either the controller (state machine) in the RDY/-BSY state card of the memory card interface or the memory is in the BSY state, this signal goes low. When configuration is made for an I/O card, an interrupt occurs when the erase operation or the program has been completed. For the interrupt mode, either the level mode or the pulse mode can be selected by setting the configuration option register. Since this signal is outputted at an open drain, pull-up is necessary on the part of the host.

-IORD: This signal is used to read information from a register set in the IC card when configuration is made for an I/O card.

-IOWR: This signal is used to write information in a register set in the IC card when configuration is made for an I/O card.

RESET: This signal is used to reset the internal circuitry of the IC card.

-CD1: IC card sense signal. The IC card outputs a low-level signal. When the host interface has sensed the low IC-card sense signal and the low-level signal from the IC card, this means that the IC card is inserted properly. This signal is also used to sense whether the IC card is removed or not.

-INPACK: Input response signal. This signal goes low when -CE and -IORD are low and the address on the address bus has coincided with the I/O port in the IC card. This signal is at an open drain and is at high impedance with the IC memory IC card interface. It is recommended that the host should not use -INPACK signal for buffer control. This signal is not supported when reading is effected at the memory card interface or when information is read from the attribute memory.

VCC: A 5-V operating power supply.

VPP1: A 12-V program power supply. This is used when information is written in the attribute memory. The voltage of a VPP1 for an information apparatus which does not write information in the attribute memory, must be 5 V (VCC). Normally, a dedicated programmer is used for writing information in the attribute memory.

GND: Ground

The attribute information about the IC card 1 includes: a physical layer including the shape of the card, the dimensions and the electrical characteristics, a basic interchangeable layer for determining the basic structure of a data structure, and information necessary for physically accessing a card, such as the device, the capacity, and the access speed of a memory card. Since the attribute information does not necessarily have to be rewritable, there is no problem if it is stored in the read-only attribute memory 92. In addition to this, a data format layer, a data structure layer, and information higher in level that a system inherent layer are also included in the attribute information, but these pieces of information are not necessarily stored in the attribute memory 92, but may be written in the nonvolatile memories 93 and 94. The attribute memory 92 is basically a nonvolatile memory. The layer information may be selectively stored in either the nonvolatile memories 93 and 94 or the attribute memory 92 as required. Since the amount of the attribute information is much smaller that of the data, a low-cost memory with a smaller storage capacity can be used for the attribute memory 92. When memories with a limited number of writes, like EEPROMs (electrically erasable programmable ROMs), are used for the nonvolatile memories 93 and 94, the service life of these memories 93 and 94 can be made longer.

Figure 15:
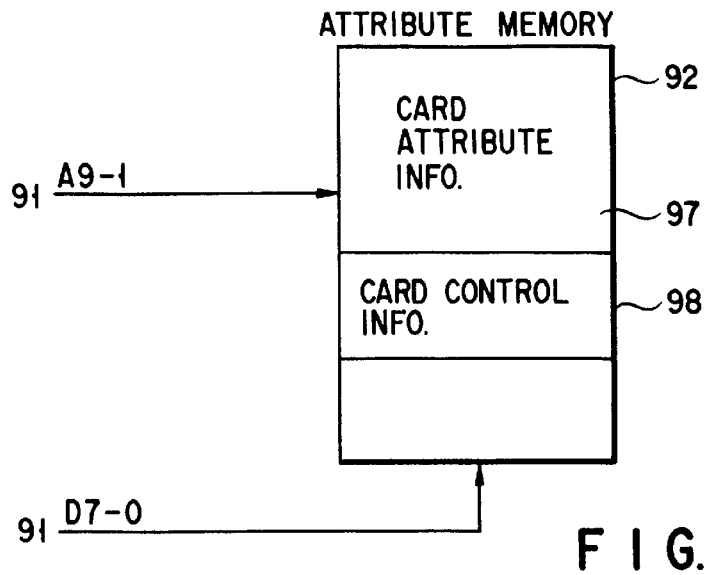
FIG. 15 illustrates the data held in the attribute memory of FIG. 12.

FIG. 13 shows various registers provided in the memory control section 91. FIG. 14 illustrates the connections for a read and a write operation. The nonvolatile memories 93 and 94 are controlled by an address register 95 and a data register 96 in the memory control section 91. The address register 95 accesses the nonvolatile memories 93 and 94 via signal line MA31-0 according to signal D7-0 supplied from an external unit. The memory areas of the nonvolatile memories 93 and 94 are divided into blocks, each consisting of, for example, PAGE 0 to PAGE 15. The data register 96 accesses the data buffers of the nonvolatile memories 93 and 94 via signal line MD7-0 according to the signal supplied over D7-0. This enables the reading and writing of data. FIG. 15 shows the data stored in the attribute memory 92. In the attribute memory 92, the card attribute information 97 and the card control information 98 are written. The memory control section 91 accesses the card attribute information in the attribute memory 92 via signal line A9-1. The card attribute information read from the attribute memory 92 is returned to the memory control section 91 via signal line D7-0. It is desirable that all the data to be stored in the attribute memory 92 should be written in even addresses. Writing data in this way is convenient for common use of these memories because data is written in even addresses in a 16-bit memory and an 8-bit memory.

Figure 17:
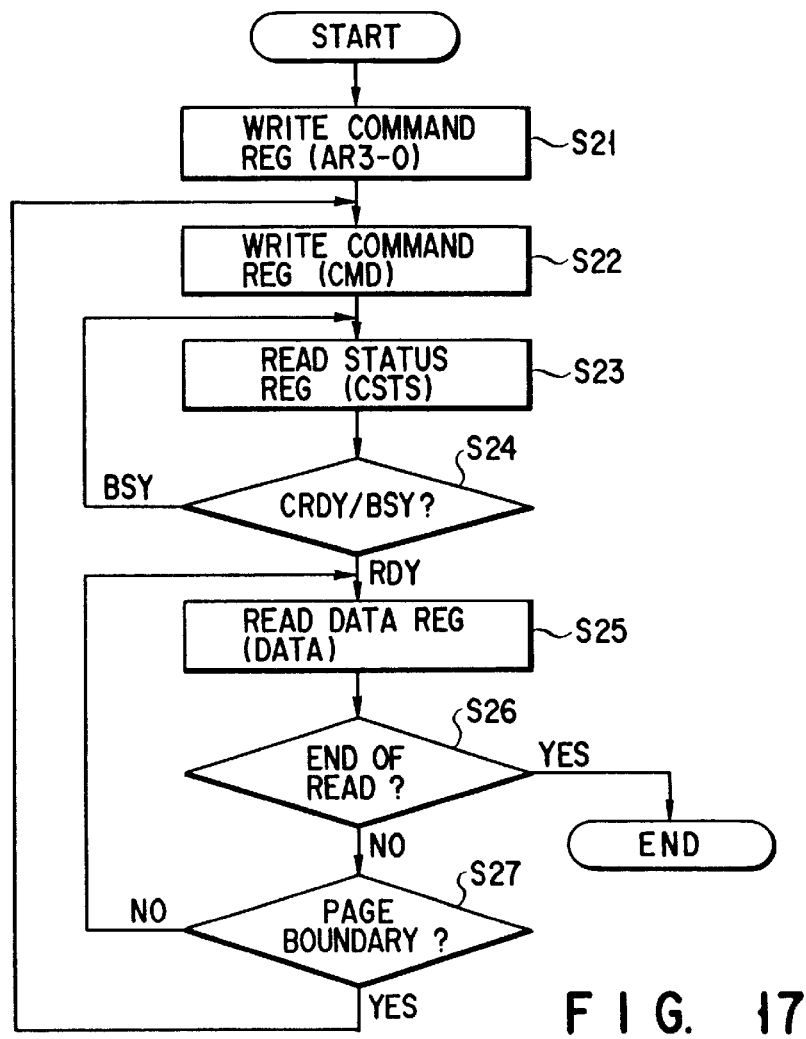
FIG. 17 is a flowchart of the procedure of the data readout operation in the IC card of FIG. 12.

FIGS. 16, 17, and 18 show the program operating procedure, the memory reading procedure, and the chip/block erasing procedure of the IC card of FIG. 11, respectively. Before explaining each procedure, each command handled by the IC card will be enumerated below.

(Memory Read Command)

Data is read from the memory address previously set in response to the request from an external information apparatus. Data reading is effected by reading the data registers in the IC card consecutively. The address is automatically incremented and can continue the reading beyond a page boundary. At a block boundary, the address is not incremented automatically. It takes 15 microseconds to access a page, and in the meantime, the card is in a busy state. The external unit and the controller must judge the ready/busy state on a page boundary. It must not be expected tacitly that the memories are set in the read mode.

(Block Erase Command)

The memory block at a given memory address is electrically erased in unison. When the IC card is operating in the I/O mode, an interrupt occurs after the erasing operation has been completed. When the IC card is operating in the memory mode, the completion of the erasing operation is sensed by RDY-BSY (ready/busy) signal or the status signal.

(Chip Erase)

The memory chip containing the address previously set is erased. In executing this command, the host must recognize a chip boundary. When the card is operating in the I/O mode, an interrupt occurs after the erasing operation has been completed. When the card is operating in the memory mode, the completion of the erasing operation is sensed by RDY-BSY (ready/busy) signal or the status signal.

(Program Command)

Data is written in the memory page by page, and verification is automatically performed. Before execution of the program command, the address must be set and a page of data to be written must be transmitted according to the data buffer write command. For a program in the same block, its address need not be set again at a page boundary. The address is automatically incremented at a page boundary.

At program time, the address is not incremented automatically at a block boundary. This is because the status must be fixed in a manner that points at the memory chip address for reading the status according to the status read command following the program. The program operation on the continuous page areas is effected in ascending order of page addresses, not in random order of page addresses. Data can be overwritten on the same page a maximum of 10 times, for example.

Since in a verify operation, the contents of the data buffer are changed, even when the same data is programmed on another page, the data never fails to be transmitted by the data buffer write command. It is impossible to effect the page copy operation of reading a certain page and programming the data in the data buffer on anther page. A page copy operation via the data buffer causes erroneous data to be written.

(Status Read Command)

By the following status read commands, the internal state of the memory can be read out.

-WP stands for WRITE PROTECT SWITCH STATUS for write disable and write enable.

WSRDY stands for MEMORY STATUS READY for ready and busy states.

SUSPEND MULTI-BLOCK ERASE SUSPENDED indicates that operation is suspended by a multi-block erase suspend command. Because the current IC card does not use a multi-block erase suspend command, the card is always in a suspended state.

REU "0" represents Reserved for Future Use (Always "0"). It is always at 0 in a reserved bit.

FAIL indicates the pass/fail state after an erase or program operation has been completed. When FAIL goes to 0, this means a pass, and when it goes to 1, this means a failure (error).

Specifically, when a status read command is executed after a memory read operation, a reset command must be executed before the execution of the status read command. This is because in the course of reading information from the memory, the status read command cannot be executed. Since the current card does not read the redundant portion, the memory read operation ends with a suspended state. Although for a status read command, normally, the memory address from which the status is to be read must be set in advance, the address need not be set immediately after a block erase, a multi-block erase, or a chip erase command has been executed. A status read command can be accepted even in a busy state.

(ID Read Command (for test and closed use))

This command is used to read a 2-byte JEDEC ID. All bytes in the address register are set at 00h before the execution of an ID read command.

(Data Buffer Write Command)

This command is used to write data to be programmed in the data buffer. The address to be programmed must be set before the execution of the data buffer write command. Since in the same block, the address is automatically incremented, an address need not be set at a page boundary. During a data buffer write operation, the operation can be suspended by a reset command. While the reset command is being executed, the card is in a busy state for a certain period of time.

(Data Buffer Read Command (for test and closed use))

This command is used to read data from the data buffer. When data is read from the data buffer after the execution of the program command, the verify result can be judged bit by bit. "0" means that data has been written properly, and "1" means that an error has occurred in the writing.

(Reset Command)

The card and all the memories are reset. After the execution of the reset command, the card is brought in a busy state for nearly three microseconds. The reset command can be accepted even in the busy state.

With those commands, each operation in FIGS. 16 through 18 are executed. The program operation in FIG. 16 begins by writing an address in the address register at step (S1). Then, a command is written in the data buffer (S1) and the status is read from the status register (S1). At this time, the controller sends an address and a command to the memory. Then, at step S4, the controller checks to see if the memory is either ready or busy. If it is busy, control returns to step S3. If it is ready, step S5 is executed. At step S5, data is transferred to the memory via the data register. Next, at step S6, it is judged whether or not the data has ended. If it has not ended, control returns to step S5. If it has ended, at step S7, a command is written in the command register. Then, at step S8, the status is read from the status register. At this time, the controller transfers a command to the memory. At step S9, the controller checks to see if the memory is either ready or busy. If it is busy, control returns to step S8. If it is ready, at step S10, data is read from the status register. Then, at step S11, the status of the memory is checked. Next, at step S12, a command is written in the command register. Then, at step S13, data is read from the status register. At this time, the controller transfers a command to the memory. At step S14, the controller checks the status of the memory. If the memory is busy, control returns to step S12. If it is ready, at step S15, data is read from the data register. Finally, at step S16, a check is made for PASS or FALL. If it is PASS, it means an end. If it is FALL, an error is out putted.

A memory read operation of FIG. 17 begins by writing an address in the address register at step S21. Then, at step S22, a read command is written in the command register. At step 23, data is read from the status register. At this time, the controller transfers an address and a command to the memory. Then, at step S24, the controller checks to see if the memory is either busy or ready. If it is busy, control returns to step S23. If it is ready, step S25 is executed. At step 25, data continues to be read from the data register until at step 26, a read end is sensed. During the time when data is being read, at step S27, a page boundary is checked. If no page boundary is sensed, control goes back to step S25. If a page boundary is sensed, control returns to step S22.

A block/chip erase operation of FIG. 18 begins by writing an address in the address register at step S31. Then, a block erase command or a chip erase command is written in the command register (S32), and data is read from the status register (S33). At this time, the controller transfers an address and a command to the memory. At step S34, the controller checks to see if the memory is either ready or busy. If it is busy, control goes back to step S33. If it is ready, step S35 is executed. At step S35, a block erase command or a chip erase command is written in the command register. Then, at step S36, data is read from the status register. At step S37, the controller checks to see if the memory is either ready or busy. If it is busy, control returns to step S36. If it is ready, at step S38, data is read from the status register or INT. Then, at step S39, the status of the memory or INT is checked. Then, at step S40, a status read command is written in the command register. At step S41, data is read from the status register. At this time, the controller transfers a command to the memory. At step S42, the controller checks the status of the memory. If the memory is busy, control returns to step S41. If it is ready, at step S43, data is read from the data register. Finally, at step S44, a check is made for PASS or FALL. If it is PASS, it means an end. If it is FALL, an error is outputted.

As has been described above, with the present invention, because data generated from various information apparatuses is transmitted together with information as to a method of reading the data (information source description data) to another information apparatus via an IC card and a transmission line, it is not necessary to previously give another information apparatus information about a method of reading the data unique to the information apparatus on the transmission side. This makes it possible not only to build an information transmission network with relative ease, but also to exchange data between data-incompatible information apparatuses. When information about a method of reading the data unique to an information apparatus at the calling party has been previously given to an information apparatus on the called party and held there, it is possible for the apparatus on the called party to identify the information apparatus on the calling party on the basis of the identification information contained in the information source description data, and to read data by the reading method unique to the identified apparatus at the calling party.

When an IC card is used as a transmission medium, even an information apparatus without a function compatible with a transmission line can be built in an information transmission network. Additionally, the use of IC cards eliminates the trouble of building a transmission line, thereby making it possible to build an information transmission network with relative ease. Because a nonvolatile semiconductor memory element is used as the internal memory of the IC card, a power supply need not be built in the card. Thus, the IC card can be made so much smaller and its portability can be improved. The danger of losing the data becomes lower, improving the data retaining reliability. Furthermore, the trouble of replacing dead batteries can be eliminated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing system comprising:

a first data processing apparatus for processing data which is of a first format;

a second data processing apparatus for processing data which is of a second format; and a memory card, capable of being connected to said first and second data processing apparatuses, for transferring the data of the first format from the first data processing apparatus to the second data processing apparatus, wherein said first data processing apparatus writes into the memory card the data of the first format and reading method information of the data of the first format and said second data processing apparatus reads from the memory card the data of the first format using the reading method information and converts the read data of the first format to data of the second format.

2. The system according to claim 1, wherein said memory card is a portable card in which a nonvolatile semiconductor memory is built.

3. The system according to claim 2, wherein said nonvolatile semiconductor memory is an electrically erasable ROM.

4. The system according to claim 2, wherein said memory card is externally supplied with a driving power.

5. The system according to claim 2, wherein said first data processing apparatus and second data processing apparatus each are provided with control means for directly controlling said non-volatile semiconductor memory.

6. The system according to claim 5, wherein said control means causes the writing of the data and the reading method information of the data of the first format to said semiconductor memory, wherein the reading method information of the data of the first format is written in a different level of hierarchy from that of the data.

7. The system according to claim 5, wherein the control means divides the information into time units or into frames to obtain the data, and causes the writing of the data and the reading method information of the data of the first format to said semiconductor memory, wherein reading method information of the data of the first format is written in a different level of hierarchy from that of the data.

8. The system according to claim 2, wherein said memory card contains control means for controlling said nonvolatile semiconductor memory.

9. The system according to claim 8, wherein said control means causes the writing of the data and the reading method information of the data of the first format to said semiconductor memory, wherein the reading method information of the data of the first format are written in a different level of hierarchy from that of the data.

10. The system according to claim 8, wherein said control means divides the information into time units or into frames to obtain the data, and causes the writing of the data and the reading method information of the data of the first format to said semiconductor memory, wherein the reading method information of the data of the first format is written in a different level of hierarchy from that of the data.

11. A data processing apparatus forming a data processing system with another apparatus which processes data of a second format and a memory card which are capable of being connected to the data processing apparatus and the other apparatus, the data processing apparatus comprising:

means for processing data of a first format; and means for writing into the memory card the data of the first format and reading method information of the data of the first format, whereby the data of the first format and the reading method information are transferred to the other apparatus and the other apparatus reads from the memory card the data of the first format using the reading method information and converts the read data of the first format to data of the second format.

12. A memory card capable of being connected to a first data processing apparatus for processing data of a first format and to a second data processing apparatus for processing data of a second format, the memory card comprising:

means for storing the data of the first format; and means for storing reading method information of the data of the first format, whereby the second data processing apparatus reads from the memory card the data of the first format using the reading method information and converts the read data of the first format to data of the second format.

* * * * *